United States Patent
Wilkes (10) Patent No.: US 12,244,682 B2
(45) Date of Patent: *Mar. 4, 2025

(54) IMPATIENT SYSTEM FOR QUERYING STATELESS COMPUTING PLATFORMS

(71) Applicant: Hound Technology, Inc., San Francisco, CA (US)

(72) Inventor: Ian Wilkes, San Francisco, CA (US)

(73) Assignee: Hound Technology, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/463,639

(22) Filed: Sep. 8, 2023

(65) Prior Publication Data

US 2023/0421664 A1 Dec. 28, 2023

Related U.S. Application Data

(63) Continuation of application No. 17/837,924, filed on Jun. 10, 2022, now Pat. No. 11,758,019.

(51) Int. Cl.
*H04L 67/60* (2022.01)
*H04L 43/0823* (2022.01)
*H04L 43/16* (2022.01)

(52) U.S. Cl.
CPC .......... *H04L 67/60* (2022.05); *H04L 43/0823* (2013.01); *H04L 43/16* (2013.01)

(58) Field of Classification Search
CPC ...... H04L 67/60; H04L 43/0823; H04L 43/16
See application file for complete search history.

(56) References Cited

U.S. PATENT DOCUMENTS

| | | | |
|---|---|---|---|
| 8,646,104 B2 | 2/2014 | Schneider | |
| 9,360,919 B2* | 6/2016 | Iwasaki | ................. G06F 1/3203 |
| 10,175,892 B1* | 1/2019 | Kim | ...................... G06F 3/0653 |
| 11,632,439 B2 | 4/2023 | Shribman | |
| 2007/0242628 A1 | 10/2007 | Dutta | |
| 2010/0268758 A1* | 10/2010 | Boykin | ..................... G06F 9/54 |
| | | | 709/203 |

(Continued)

*Primary Examiner* — Michael A Keller
*Assistant Examiner* — Thao D Duong
(74) *Attorney, Agent, or Firm* — PATENT LAW WORKS LLP (57) ABSTRACT

A system and method for issuing requests to a stateless computing platform is described. In an example implementation, the system may include a stateless computing platform configured to receive and service a first set of requests and a second set of requests from a stateful server. The stateful server may be configured to determine the first set of requests in association with a client operation, issue the first set of requests to the stateless computing platform, determine whether a cumulative percentage of requests in the first set of requests serviced by the stateless computing platform meets a threshold, reissue a remainder of the requests in the first set of requests as the second set of requests to the stateless computing platform responsive to determining that the cumulative percentage of requests in the first set of requests serviced by the stateless computing platform meets the threshold, and monitor, in parallel, the first set and the second set of requests until the remainder of the requests in either of the first set or the second set of requests is serviced by the stateless computing platform.

20 Claims, 3 Drawing Sheets

(56) References Cited

U.S. PATENT DOCUMENTS

| | | | |
|---|---|---|---|
| 2010/0274893 A1 | 10/2010 | Abdelal | |
| 2015/0186214 A1* | 7/2015 | Gladwin | G06F 11/0793 714/766 |
| 2016/0164690 A1 | 6/2016 | Fukuda | |
| 2016/0179607 A1* | 6/2016 | Kulkarni | G06F 11/0751 714/4.21 |
| 2018/0115392 A1* | 4/2018 | Yang | H04W 24/02 |
| 2018/0157524 A1* | 6/2018 | Saxena | G06N 20/00 |
| 2019/0037027 A1* | 1/2019 | Brooks | H04L 41/40 |
| 2019/0138633 A1 | 5/2019 | Charles | |
| 2021/0075779 A1* | 3/2021 | Li | H04L 63/083 |
| 2023/0421664 A1* | 12/2023 | Wilkes | H04L 69/40 |

* cited by examiner

Figure 3

IMPATIENT SYSTEM FOR QUERYING STATELESS COMPUTING PLATFORMS

CROSS-REFERENCE TO RELATED APPLICATION

This application is a continuation of U.S. patent application Ser. No. 17/837,924, filed Jun. 10, 2022, and entitled "Impatient System for Querying Stateless Computing Platforms," which is incorporated herein by reference in its entirety.

BACKGROUND

The specification generally relates to issuing requests to a stateless computing platform for performing various client operations. In particular, the specification relates to a system and method for reissuing a remainder of requests waiting to be serviced in a set of requests to the stateless computing platform.

Reliability and responsiveness has always been a concern in distributed computing systems, such as cloud computing. In particular, there is no determination available ahead of time to customers as to what may fail in a stateless computing platform provided by a cloud service provider. One example of failure is that a request issued to the stateless computing platform may take a long time to be serviced. It is often difficult to predict to how long it may take for the stateless computing platform to return a response to a specific request. As such, there is a persistent need to improve the reliability of performing various client operations when corresponding requests are issued to the stateless computing platform.

This background description provided herein is for the purpose of generally presenting the context of the disclosure.

SUMMARY

According to one innovative aspect of the subject matter described in this disclosure, a method includes: determining, by a stateful server, a first set of requests in association with a client operation, issuing, by the stateful server, the first set of requests to a stateless computing platform, determining, by the stateful server, whether a cumulative percentage of requests in the first set of requests serviced by the stateless computing platform meets a threshold, reissuing, by the stateful server, a remainder of the requests in the first set of requests as a second set of requests to the stateless computing platform responsive to determining that the cumulative percentage of requests in the first set of requests serviced by the stateless computing platform meets the threshold, and monitoring, by the stateful server, the first set and the second set of requests in parallel until the remainder of the requests in either of the first set or the second set of requests is serviced by the stateless computing platform.

According to another innovative aspect of the subject matter described in this disclosure, a system includes: a stateless computing platform configured to receive and service a first set of requests and a second set of requests from a stateful server; the stateful server configured to determine the first set of requests in association with a client operation, issue the first set of requests to the stateless computing platform, determine whether a cumulative percentage of requests in the first set of requests serviced by the stateless computing platform meets a threshold, responsive to determining that the cumulative percentage of requests in the first set of requests serviced by the stateless computing platform meets the threshold, reissue a remainder of the requests in the first set of requests as the second set of requests to the stateless computing platform, and monitor, in parallel, the first set and the second set of requests until the remainder of the requests in either of the first set or the second set of requests is serviced by the stateless computing platform.

These and other implementations may each optionally include one or more of the following operations. For instance, the operations may include: determining whether servicing of the cumulative percentage of requests in the first set of requests by the stateless computing platform to meet the threshold is possible, and reissuing at least a portion of the first set of requests to the stateless computing platform based on a tradeoff between a cost of reissue and servicing of the first set of requests responsive to determining that the servicing of the cumulative percentage of requests in the first set of requests by the stateless computing platform to meet the threshold is impossible; determining a failure rate of the stateless computing platform, and determining the threshold based on the failure rate of the stateless computing platform. Additionally, these and other implementations may each optionally include one or more of the following features. For instance, the features may include reissuing the remainder of the requests in the first set of requests as the second set of requests to the stateless computing platform further comprising identifying the remainder of the requests in the first set of requests as having a potential issue, copying the remainder of the requests from the first set of requests to the second set of requests, and issuing the second set of requests to the stateless computing platform; reissuing the remainder of the requests in the first set of requests as the second set of requests to the stateless computing platform further comprising retaining the remainder of the requests in the first set of requests and waiting for the remainder of the requests in the first set of requests to be serviced by the stateless computing platform; monitoring the first set and the second set of requests in parallel until the remainder of the requests in either of the first set or the second set of requests is serviced by the stateless computing platform further comprising identifying whether the remainder of the requests in one of the first set and the second set of requests is serviced before other one of the first set and the second set of requests by the stateless computing platform, and canceling the remainder of the requests in the other one of the first set and the second set of requests issued to the stateless computing platform responsive to identifying that the remainder of the requests in one of the first set and the second set of requests is serviced before other one of the first set and the second set of requests; the threshold being a difference between 100 and a multiple of the failure rate; a number of times that the second set of requests is reissued to the stateless computing platform being based on the failure rate; the failure rate being one of a statistical failure rate and a dynamically measured failure rate; and the threshold being set in a range from 85 percent to 99 percent.

Other implementations of one or more of these aspects and other aspects include corresponding systems, apparatus, and computer programs, configured to perform the various action and/or store various data described in association with these aspects. Numerous additional features may be included in these and various other implementations, as discussed throughout this disclosure.

The features and advantages described herein are not all-inclusive and many additional features and advantages will be apparent in view of the figures and description.

Moreover, it should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

The techniques introduced herein overcome the deficiencies and limitations of the prior art, at least in part, with a system and methods for reissuing a remainder of requests in a set of requests initially issued to the stateless computing platform 130 after a threshold percentage of requests in the set of requests is serviced by the stateless computing platform 130. For example, the remainder of requests in the set of requests initially issued to the stateless computing platform 130 may be waiting to be serviced by the stateless computing platform 130 at the time when they are reissued to the stateless computing platform 130 as a fresh set of requests.

In some implementations, a stateful server 120 hosting one or more stateful services may receive a user query via a user application 110 on one or more client devices 115. The stateful server 120 may determine and issue a set of requests corresponding to the user query to a stateless computing platform 130 for response. The set of requests may be associated with performing a number of units of work at the stateless computing platform 130. For example, a unit of work may include retrieving data, performing a computational task, etc. The system underpinning the stateless computing platform 130 may be or become unreliable. For example, the stateless computing platform 130 may be a serverless computing platform that takes a long time to respond to a request and time out the request. The unreliability of the system may be a result of a plurality of compounding factors, such as the data with unknown properties being accessed, queries with unknown characteristics being created by users, cloud data processing system with unknown response times, and underlying cloud storage system having unpredictable swings in throughout. For example, the user query may include different parameters that were not seen before by the stateless computing platform 130 and/or may have to be performed on the data that the stateless computing platform 130 is not familiar with. An effect of the aforementioned compounding factors makes it difficult to predict how long the stateless computing platform 130 may take to generate a response to a request. This difficulty with predicting a response time leads to undesirable situations. For example, if the time that the stateless computing platform 130 is supposed to take for responding to a request is 10 seconds but the wait to time out is set at 200 milliseconds, then the request will continue to get retried several times at the stateless computing platform 130. In another example, if the time that the stateless computing platform 130 is supposed to take for responding to a request is 100 milliseconds but the wait to time out is set at 10 seconds, then the wait for the time out to occur is going to be long.

The systems and methods of the present disclosure utilize an impatient query system in association with issuing requests to the stateless computing platform 130 for improving the reliability of performing client operations. The impatient query system is dynamic in that it relies on a threshold for reissuing requests to the stateless computing platform 130. In one example, the threshold may be determined based on a tradeoff between a computational cost of reissuing requests and reliable performance of client operations. In another example, the threshold may be determined based on a known failure rate of the stateless computing platform 130. The impatient query system issues a set of requests associated with a client operation to the stateless computing platform 130. Instead of assigning a fixed time out for the servicing of the set of requests, the impatient query system waits for response to a threshold percentage of requests to arrive from the stateless computing platform 130. In some implementations, the impatient query system determines an amount of time it takes to service a typical request based on an order of arrival of responses to the threshold percentage of requests. The impatient query system identifies the remainder of requests in the set of requests as potentially having an issue based on the aforementioned determination. For example, the impatient query system may identify the remainder of requests as potentially to have timed out at the stateless computing platform 130. In another example, the impatient query system may identify the remainder of requests as potentially waiting to be serviced by the stateless computing platform 130. The impatient query system copies the remainder of requests to a fresh set of requests and reissues the fresh set of requests to the stateless computing platform 130. For example, if a set of 100 requests are initially issued to the stateless computing platform 130 and response is received for a threshold percentage (e.g. 95%) of the requests, the impatient query system copies the remainder (e.g., 5%) of the requests and reissues them to the stateless computing platform 130. The impatient query system retains and monitors, in parallel, both of the initially issued set of requests (original) and the reissued set of requests until one of them is serviced and a response for the remainder of requests is returned by the stateless computing platform 130. For example, the impatient query system uses the response from the reissued set of requests and cancels the remainder of requests in the original set of requests if the stateless computing platform 130 services the reissued set of requests before the original set of requests. Alternatively, if the stateless computing platform 130 returns a response for the original set of requests before the reissued set of requests, the impatient query system cancels the reissued set of requests.

Figure 1:
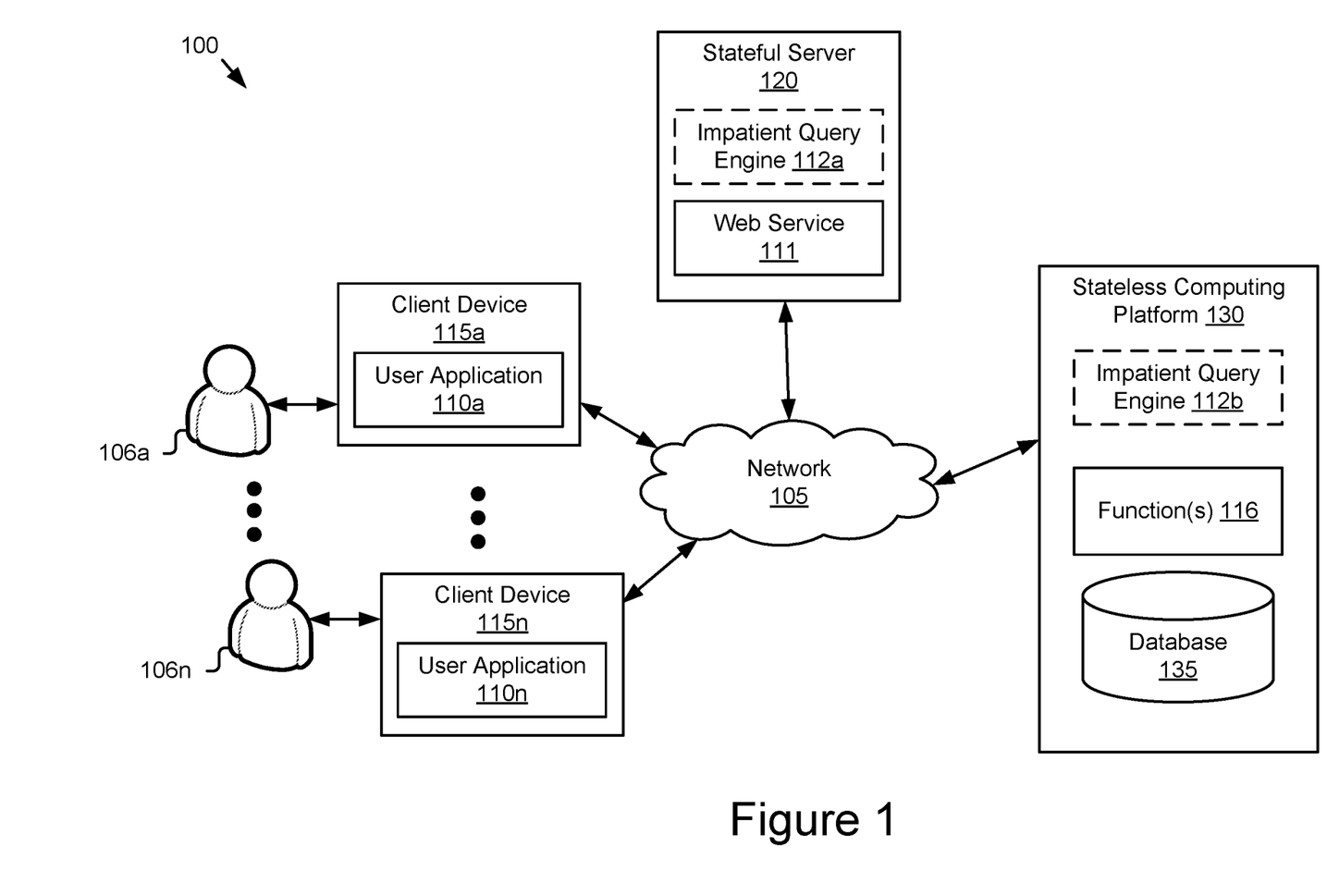
FIG. 1 is a high-level block diagram illustrating one implementation of an example impatient query system for reissuing a remainder of requests after a threshold percentage of requests in a set of requests is serviced.

FIG. 1 is a high-level block diagram illustrating an example impatient query system 100 for reissuing a remainder of requests after a threshold percentage in a set of requests is serviced.

The illustrated system 100 may include client devices 115a . . . 115n (also referred to herein individually and/or collectively as 115) that can be accessed by users 106a . . . 106n, a stateful server 120, and a stateless computing platform 130, which are electronically communicatively coupled via a network 105 for interaction and electronic communication with one another, although other system configurations are possible including other devices, systems, and networks. For example, the system 100 could include any number of client devices 115, stateful servers 120, stateless computing platforms 130, networks 105, and other systems and devices. In FIG. 1 and the remaining figures, a letter after a reference number, e.g., "115*a*," represents a reference to the element having that particular reference number. A reference number in the text without a following letter, e.g., "115," represents a general reference to instances of the element bearing that reference number. In some implementations, the stateless computing platform 130 may be located remotely (e.g., on the network or physical location) from one or both of the client device 115 and the stateful server 120.

The network 105 may be a conventional type, wired or wireless, and may have numerous different configurations including a star configuration, token ring configuration, or other configurations. Furthermore, the network 105 may include any number of networks and/or network types. For example, the network 105 may include, but is not limited to, one or more local area networks (LANs), wide area networks (WANs) (e.g., the Internet), virtual private networks (VPNs), mobile (cellular) networks, wireless wide area network (WWANs), WiMAX® networks, personal area networks (PANs) (e.g., Bluetooth® communication networks), peer-to-peer networks, near field networks (e.g., NFC, etc.), and/or other interconnected data paths across which multiple devices may communicate, various combinations thereof, etc. These private and/or public networks may have any number of configurations and/or topologies, and data may be transmitted via the networks using a variety of different communication protocols including, for example, various Internet layer, transport layer, or application layer protocols. For example, data may be transmitted via the networks using TCP/IP, UDP, TCP, HTTP, HTTPS, DASH, RTSP, RTP, RTCP, VOIP, FTP, WS, WAP, SMS, MMS, XMS, IMAP, SMTP, POP, WebDAV, or other known protocols.

The client devices 115*a* . . . 115*n* (also referred to individually and collectively as 115) may be computing devices having data processing and communication capabilities. In some implementations, a client device 115 may include a memory, a processor (e.g., virtual, physical, etc.), a power source, a network interface, software and/or hardware components, such as a display, graphics processing unit (GPU), wireless transceivers, keyboard, camera (e.g., webcam), sensors, firmware, operating systems, web browsers, applications, drivers, and various physical connection interfaces (e.g., USB, HDMI, etc.). The client devices 115*a* . . . 115*n* may couple to and communicate with one another and the other entities of the system 100 via the network 105 using a wireless and/or wired connection, such as the local hub or the application server. Examples of client devices 115 may include, but are not limited to, mobile phones, tablets, laptops, desktops, netbooks, server appliances, servers, virtual machines, smart TVs, media streaming devices, or any other electronic device capable of accessing a network 105. The system 100 may include any number of client devices 115, including client devices 115 of the same or different type. A plurality of client devices 115*a* . . . 115*n* are depicted in FIG. 1 to indicate that the stateful server 120 and stateless computing platform 130 may interact with multiplicity of users 106*a* . . . 106*n* on a multiplicity of client devices 115*a* . . . 115*n*.

The client devices 115 may also store and/or operate other software such as a user application 110 (e.g., an instance of a user application 110*a* . . . 110*n*), an operating system, other applications, etc., that are configured to interact with the stateful server 120 and/or the stateless computing platform 130 via the network 105. In some implementations, the client device 115 may run a user application 110. For example, the user application 110 may be one or more of web, mobile, enterprise, and cloud application. The user application 110 may communicate with the stateful server 120 and the stateless computing platform 130. For example, the user application 110 may include a browser that may run JavaScript or other code to access the functionality provided by other entities of the system 100 coupled to the network 105. The user application 110 may connect to the stateful server 120 via the web service 111, send one or more queries, receive response data from the stateful server 120, and display the results on the client device 115. In some implementations, the client devices 115 may be implemented as a computing device 300 as will be described below with reference to FIG. 3.

In the example of FIG. 1, the entities of the system 100, such as the stateful server 120 and the stateless computing platform 130 may be, or may be implemented by, a computing device including a processor, a memory, applications, a database, and network communication capabilities similar to that described below with reference to FIG. 2. In some implementations, each one of the entities 120 and 130 of the system 100 may be a hardware server, a software server, or a combination of software and hardware.

The stateful server 120 may include data processing, storing, and communication capabilities, as discussed elsewhere herein. For example, the stateful server 120 may include one or more hardware servers, server arrays, storage devices, centralized and/or distributed/cloud-based systems, etc. In some implementations, the stateful server 120 may include one or more virtual servers, which operate in a host server environment and access the physical hardware of the host server including, for example, a processor, a memory, applications, a database, storage, network interfaces, etc., via an abstraction layer (e.g., a virtual machine manager). In some implementations, the stateful server 120 may be a Hypertext Transfer Protocol (HTTP) server, a Representational State Transfer (REST) service, or other server type, having structure and/or functionality for processing and satisfying content requests and/or receiving content from the other entities coupled to the network 105. The stateful server 120 may implement one or more stateful services and store session state for one or more client devices 115 interacting with it. For example, the stateful server 120 may keep track of one or more requests from client devices 115, which client device has opened which file, current read and write pointers for files, which files are locked by which client device 115, etc.

In some implementations, the stateful server 120 may be remote to the client device 115 and/or the stateless computing platform 130, such that the stateful server 120 communicates with the stateless computing platform 130 to perform functions, thereby reducing complexity of the stateful server 120. In the example of FIG. 1, the stateful server 120 may include a web service 111 and an impatient query engine 112*a*. The web service 111 may be dedicated to providing access to various services and information resources hosted by the stateful server 120 via web, mobile, enterprise, and/or cloud applications. The web service 111 may include one or more of a software as a service, infrastructure as a service, platform as a service, function as a service, etc. For example, the web service 111 may include on-demand cloud computing service and associated application programming interface (API) for providing distributed computing processing capacity and software tools. In another example, the web service 111 may include allowing users to rent a virtual cluster of machines for deploying applications. It should be noted that the list of services provided as examples for the web service 111 above are not exhaustive and that others are contemplated in the techniques described herein.

The stateless computing platform 130 may include data processing, storing, and communication capabilities, as discussed elsewhere herein. The stateless computing platform 130 may be implemented as a serverless computing architecture that allocates machine resources on demand to perform one or more computational tasks. The stateless computing platform 130 may rely on the stateful server 120 to maintain session state. In the example of FIG. 1, the stateless computing platform 130 may include an impatient query engine 112b and lambda function(s) 116. A lambda function 116 may be a self-contained serverless application code written in a supported language and runtime to perform one or more computational tasks. For example, a function may be an independent unit of execution and deployment, such as a microservice. The stateless computing platform 130 is configured to execute many instances of the same function 116 or of different functions 116 in an efficient and flexible manner. The stateless computing platform 130 executes each function 116 in its own container. For example, when a function 116 is created, the stateless computing platform 130 packages it into a new container and executes that container on a multi-tenant cluster of machines on demand. In some implementations, the stateless computing platform 130 executes one or more functions 116 in response to events (e.g., multiple individual requests with associated timestamps) and automatically manages the computing resources required by that code. For example, the stateless computing platform 130 may be configured to receive HTTP requests from the stateful server 120 via an API of the web service 111, automatically provision backend services triggered by the HTTP requests, and deallocate such services when corresponding application code is not in use. The stateless computing platform 130 sends the response generated by the functions 116 for individual requests to the stateful server 120 which then collates the responses into a final result. In some implementations, the stateless computing platform 130 may also include a database 135 to store structured data in a relational database and a file system (e.g., HDFS, NFS, etc.) for unstructured or semi-structured data. In some implementations, the stateless computing platform 130 may include an instance of a data storage 243 that stores various types of data for access and/or retrieval by the impatient query engine 112b. For example, the data store may store response data for a set of requests. Other types of user data are also possible and contemplated. It should be understood that a single stateless computing platform 130 may be representative of a cloud computing service provider and there may be multiple cloud computing service providers coupled to the network 105, each having its own server or a server cluster, applications, application programming interface, etc.

The impatient query engine 112 may include software and/or logic to provide the functionality for reissuing a remainder of requests after a threshold percentage in a set of requests is serviced. In some implementations, the impatient query engine 112 may be implemented using programmable or specialized hardware, such as a field-programmable gate array (FPGA) or an application-specific integrated circuit (ASIC). In some implementations, the impatient query engine 112 may be implemented using a combination of hardware and software. In some implementations, the impatient query engine 112 may be stored and executed on various combinations of the client device 115, the stateful server 120, and the stateless computing platform 130, or by any one of the client devices 115, the stateful server 120, or the stateless computing platform 130. As depicted in FIG. 1, the impatient query engine 112a and 112b is shown in dotted lines to indicate that the operations performed by the impatient query engine 112a and 112b as described herein may be performed at the stateful server 120, the stateless computing platform 130, or any combinations of these components. In some implementations, the impatient query engine 112 may be a thin-client application with some functionality executed on the stateful server 120 and additional functionality executed on the stateless computing platform 130. While the impatient query engine 112 is described below as a stand-alone component, in some implementations, the impatient query engine 112 may be part of other applications in operation on the client device 115, the stateful server 120, and the stateless computing platform 130.

Other variations and/or combinations are also possible and contemplated. It should be understood that the system 100 illustrated in FIG. 1 is representative of an example system and that a variety of different system environments and configurations are contemplated and are within the scope of the present disclosure. For example, various acts and/or functionality may be moved from a server 120 to a client device 115, or vice versa, data may be consolidated into a single data store or further segmented into additional data stores, and some implementations may include additional or fewer computing devices, services, and/or networks, and may implement various functionality client or server-side. Furthermore, various entities of the system may be integrated into a single computing device or system or divided into additional computing devices or systems, etc.

Figure 2:
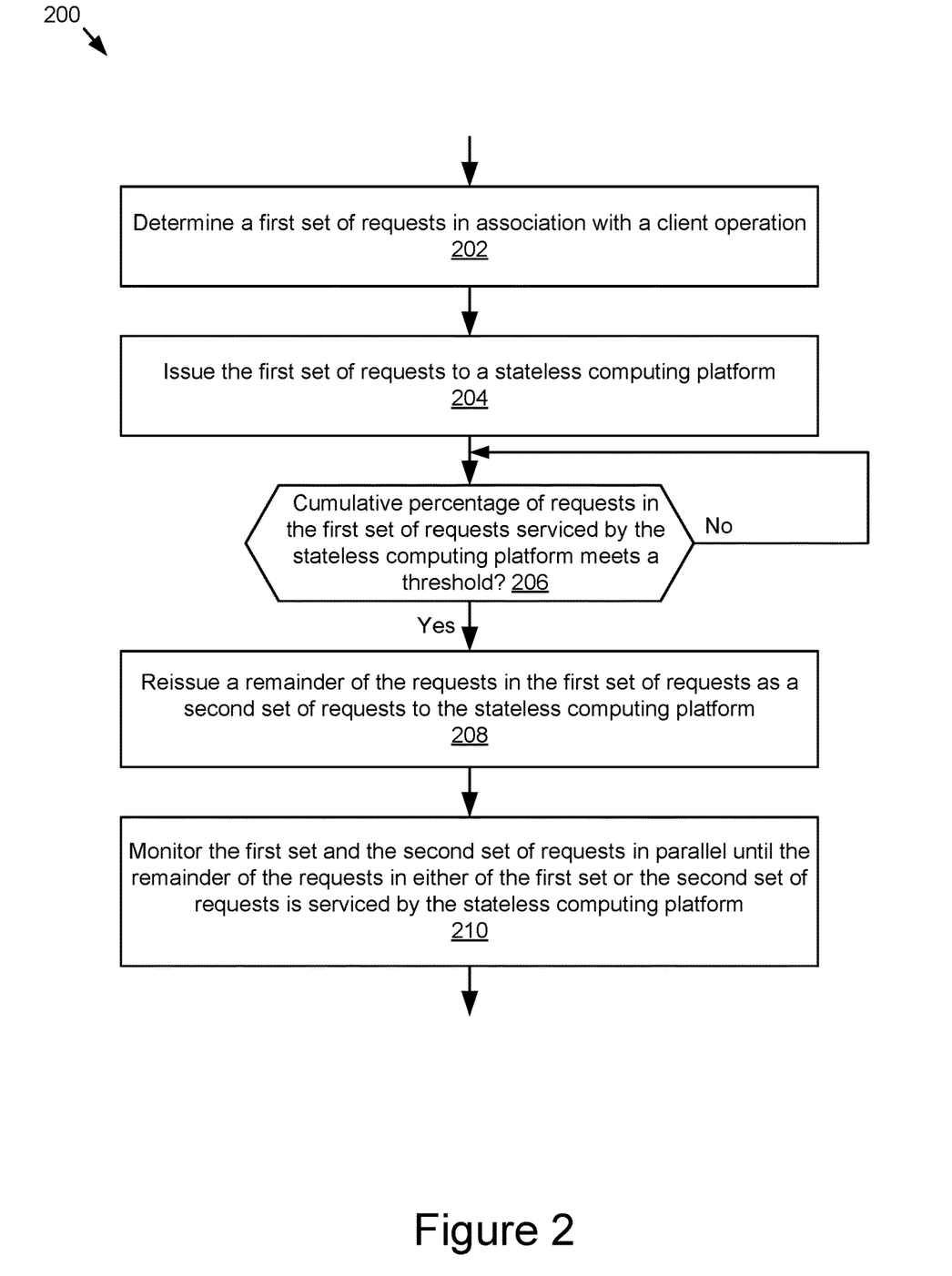
FIG. 2 is a flowchart illustrating one implementation of an example method for reissuing a remainder of requests after a threshold percentage of requests in a set of requests is serviced.

FIG. 2 is a flowchart illustrating one implementation of an example method 200 for reissuing a remainder of requests after a threshold percentage in a set of requests is serviced.

At 202, the impatient query engine 112 determines a first set of requests in association with a client operation. In some implementations, the stateful server 120 may receive a query from a user 106 via the user application 110 on the client device 115. For example, the user application 110 may connect to the stateful server 120 via the web service 111 to send one or more queries. The impatient query engine 112a in the stateful server 120 determines a first set of requests in association with the query. The first set of requests may correspond to performing a large number of units of work at the stateless computing platform 130. For example, a unit of work may include retrieving data (e.g. serving web pages, etc.), performing a computational task (e.g., processing a steam of data for an API call, saving data to a database, performing a scheduled task, etc.), etc.

At 204, the impatient query engine 112 issues the first set of requests to a stateless computing platform 130. The stateful server 120 may be unfamiliar with the client operation in terms of the query parameters and/or data to be manipulated. The stateful server 120 may not know or be able to predict the individual response time of each request at the stateless computing platform 130 and therefore does not rely on a fixed time out for the servicing of each request. The stateful server 120 communicates with the stateless computing platform 130 to perform a plurality of computational tasks, thereby reducing complexity of the stateful server 120. The stateless computing platform 130 receives the set of requests for processing from the stateful server 120. The stateless computing platform 130 determines one or more functions 116 to execute for processing the set of requests and automatically deploys the computing resources used by those functions 116. In some implementations, the stateless computing platform 130 sends the response generated by the functions 116 for each individual request in the set of requests to the stateful server 120.

At 206, the impatient query engine 112 checks whether a cumulative percentage of requests in the first set of requests serviced by the stateless computing platform 130 meets a threshold. If the threshold is not met, the impatient query engine 112 continues to wait and checks again. In some implementations, the impatient query engine 112 listens for response to the first set of requests to arrive from the stateless computing platform 130. For example, the impatient query engine 112 monitors response to a running count of requests from the stateless computing platform 130 and compares whether the running count meets the threshold. In some implementations, the impatient query engine 112 determines a threshold based on a tradeoff between computational costs associated with reissuing requests and reliable performance of client operations. For example, the impatient query engine 112 may determine a low threshold value (e.g., 1%) that almost doubles the computational cost but it may be reasonable for a critical client operation. In some implementations, the threshold may be fixed or predetermined. For example, the impatient query engine may continuously check whether the cumulative percentage of requests serviced in the first set of requests meets a predetermined threshold set at 95%. In other implementations, the threshold may include a range. For example, the threshold may be in a range from 85% to 99%. In other implementations, the impatient query engine 112 may check whether a percentage of requests remaining unresolved (e.g., requests for which responses have not arrived) in the first set of request issued to the stateless computing platform 130 meets a threshold.

In some implementations, the impatient query engine 112 determines a failure rate associated with a system of the stateless computing platform 130. For example, the failure rate may include a known failure rate based on historical data, dynamically measured failure rate based on live performance data, etc. The impatient query engine 112 determines a threshold based on a multiple of the failure rate. For example, if the impatient query engine 112 determines that requests sent to a particular stateless computing platform 130 time out less than 1% of the time (failure rate), then the impatient query engine 112 sets the threshold as a difference between 100% and some multiple of that known failure rate. In some implementations, the multiple may include a range (e.g., 2-20). For example, if the failure rate is 1% and the multiple is 5, then the threshold is 100%−5%=95%.

If the impatient query engine 112 determines that the cumulative percentage of requests in the first set of requests serviced by the stateless computing platform 130 meets the threshold, at 208, the impatient query engine 112 reissues a remainder of requests in the first set of requests as a second set of requests to the stateless computing platform 130. In some implementations, the impatient query engine 112 monitors the order of arrival of responses to peer requests in the first set of requests from the stateless computing platform 130. The impatient query engine 112 determines an average length of time for the stateless computing platform 130 to service a typical request in the first set of requests based on the order of arrival of responses. Based on the aforementioned determination, the impatient query engine 112 infers that the remainder of requests (i.e., latest of the requests) in the first set of requests after the threshold has been met as potentially having an issue. The impatient query engine 112 copies the remainder of requests to a second set of requests and reissues the second set of requests to the stateless computing platform 130. For example, if a first set of 100 requests are initially issued to the stateless computing platform 130 and response is received for a threshold percentage (e.g. 95%) of the requests, the impatient query engine 112 copies the remainder (e.g., 5%) of the requests and retries them as a second set of requests to the stateless computing platform 130. In other words, the impatient query engine 112 counts the responses to the 100 requests until the responses for 5% of the requests are determined as late to arrive, at which point, the impatient query engine identifies the 5% of the requests as the remainder for retry. Instead of canceling the remainder of requests in the first set of requests, the impatient query engine 112 retains the remainder of requests in the first set of requests and waits for the stateless computing platform 130 to generate a response for them.

In some implementations, the impatient query engine 112 may reissue the remainder of requests after the threshold has been met more than once. The impatient query engine 112 determines a number of times the remainder of the requests is reissued to the stateless computing platform 130 proportional to the failure rate of the stateless computing platform 130. For example, if the failure rate is a fraction of a percentage, the likelihood of the reissued set of requests failing again is low and the impatient query engine 112 may not reissue the remainder of requests more than once to the stateless computing platform 130. In another example, if the failure rate is 5%, then the impatient query engine 112 may reissue the remainder of requests more than once to the stateless computing platform 130.

In some implementations, the impatient query engine 112 determines whether servicing of the cumulative percentage of requests in the first set of requests by the stateless computing platform to meet the threshold is possible. A number of requests in the first set of requests may be such that it is impossible to meet the threshold. For example, the first set of requests may contain just one request. If the threshold cannot be mathematically met, the impatient query engine 112 reissues at least a portion of the first set of requests to the stateless computing platform 130 based on a tradeoff between a cost of reissue and servicing of the first set of requests. For example, if the first set of requests contains one request, the impatient query engine 112 may reissue that request again to the stateless computing platform 130. In another example, if the first set of requests includes two requests, then the impatient query engine 112 may reissue the second of the two requests again to the stateless computing platform 130.

At 210, the impatient query engine 112 monitors the first set and the second set of requests in parallel until the remainder of the requests in either of the first set or the second set of requests is serviced by the stateless computing platform 130. The impatient query engine 112 tracks both the first set and the second set of requests until a response for the remainder of requests in either one of the sets is returned by the stateless computing platform 130. This is possible for a client operation that can be safely performed at least twice at the stateless computing platform 130. In other words, a performance of the client operation does not change a state of the stateless computing platform 130 and therefore it can be performed safely at least twice. The impatient query engine 112 identifies which of the first set and the second set of requests including the remainder of requests is serviced first by the stateless computing platform 130. Once the response for the remainder of the requests is received from one set of requests, the impatient query engine 112 cancels the other set of requests. For example, the impatient query system uses the response from the second set of requests and cancels the remainder of requests in the first set of requests if the stateless computing platform 130 services the second set of requests before completely processing the remainder of the requests in the first set of requests. The stateful server 120 collates the response to the set of requests into a final result.

Figure 3:
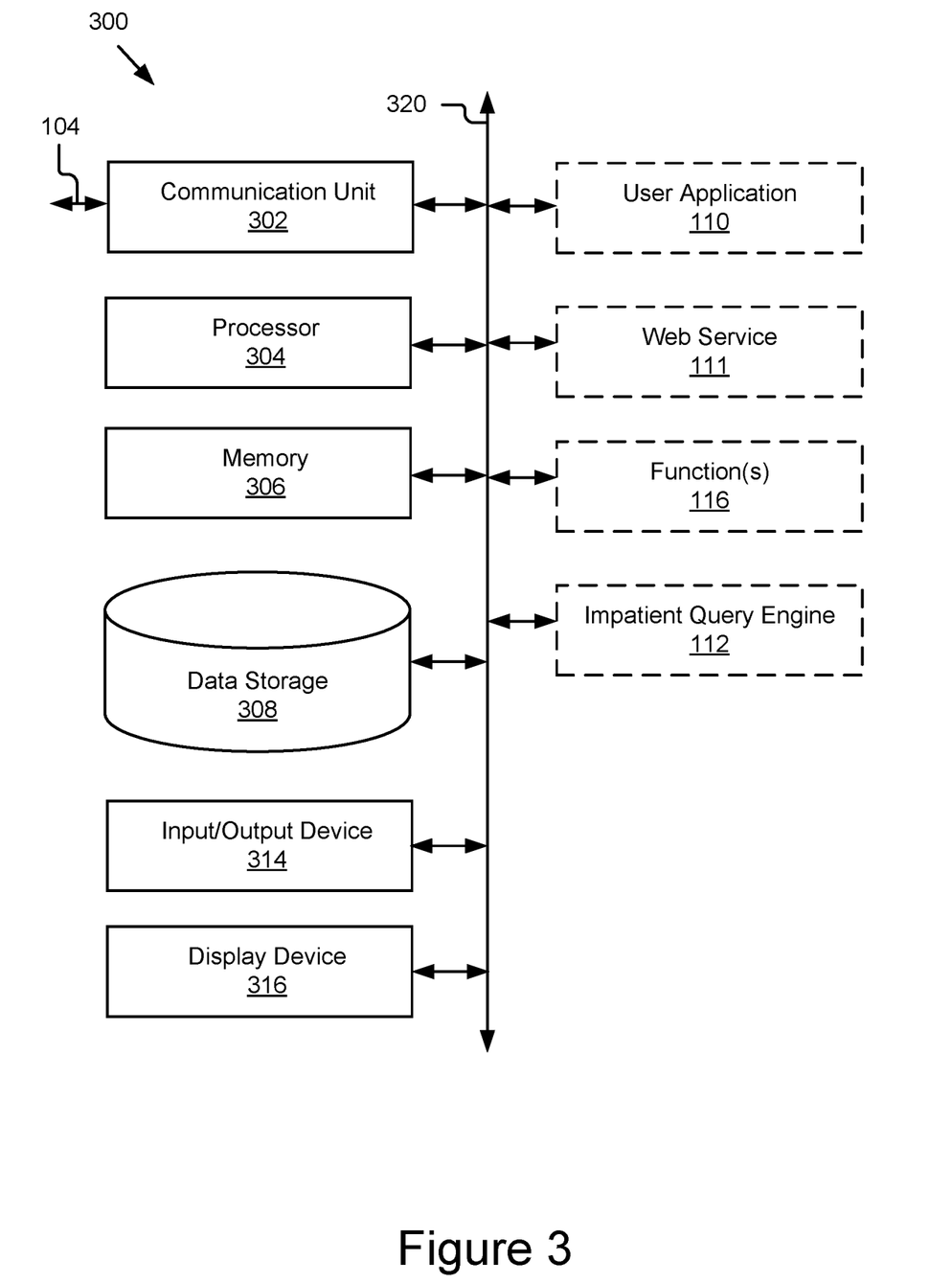
FIG. 3 is a block diagram illustrating one implementation of a computing device in the example impatient query system.

FIG. 3 is a block diagram of an example computing device 300 in the impatient query system 100.

The computing device 300 may include a processor 304, a memory 306, a display device 316, a communication unit 302, an input/output device(s) 314, and a data storage 308, according to some examples. The components of the computing device 300 are communicatively coupled by a bus 320. In some implementations, the computing device 300 may be representative of the client device 115, the stateful server 120, the stateless computing platform 130, or a combination of the client device 115, the stateful server 120, and the stateless computing platform 130. In such implementations where the computing device 300 is the client device 115, the stateful server 120 or the stateless computing platform 130, it should be understood that the client device 115, the stateful server 120, and the stateless computing platform 130 may take other forms and include additional or fewer components without departing from the scope of the present disclosure. For instance, various components of the computing devices may be coupled for communication using a variety of communication protocols and/or technologies including, for instance, communication buses, software communication mechanisms, computer networks, etc. For example, while not shown, the computing device 300 may include sensors, capture devices, various operating systems, additional processors, and other physical configurations.

As depicted in FIG. 3, the computing device 300 may include a user application 110, a web service 111, an impatient query engine 112 or function(s) 116, depending on the configuration. For instance, a client device 115 may include the user application 110; a stateful server 120 may include the impatient query engine 112 and web service 111; and the stateless computing platform 130 may include one or more of the impatient query engine 112 and function(s) 116; although other configurations are also possible and contemplated.

The user application 110 includes computer logic executable by the processor 304 on a client device 115 to provide for user interaction, receive user input, present information to the user via a display, and send data to and receive data from the other entities of the system 100 via the network 105. In some implementations, the user application 110 may generate and present user interfaces based at least in part on information received from the stateful server 120 via the network(s) 105. The user application 110 may perform other operations described herein.

The impatient query engine 112 may include computer logic executable by the processor 304 to perform operations discussed elsewhere herein. The impatient query engine 112 may be coupled to the data storage 308 to store, retrieve, and/or manipulate data stored therein and may be coupled to the web service 111, the user application 110, and/or other components of the system 100 to exchange information therewith.

The function(s) 116 may include computer logic executable by the processor 304 to perform operations discussed elsewhere herein. The function(s) 116 may be coupled to the data storage 308 to store, retrieve, and/or manipulate data stored therein and may be coupled to the impatient query engine 112, the web service 111, and/or other components of the system 100 to exchange information therewith.

The web service 111 may include computer logic executable by the processor 304 to process content requests and provide access to various services and information resources. The web service 111 may include one or more of a software as a service, infrastructure as a service, platform as a service, function as a service, or other suitable service type. The web service 111 may receive content requests (e.g., product search requests, HTTP requests) from the client device 115, cooperate with the impatient query engine 112 to determine content, retrieve and incorporate data from the data storage 508, format the content, and provide the content to the client device 115.

In some instances, the web service 111 may format content using a web language and provide the content to a corresponding user application 110 for processing and/or rendering to the user for display. The web service 111 may be coupled to the data storage 508 to store, retrieve, and/or manipulate data stored therein and may be coupled to the impatient query engine 112 to facilitate its operations, for example.

The processor 304 may execute software instructions by performing various input/output, logical, and/or mathematical operations. The processor 304 may have various computing architectures to process data signals including, for example, a complex instruction set computer (CISC) architecture, a reduced instruction set computer (RISC) architecture, and/or an architecture implementing a combination of instruction sets. The processor 304 may be physical and/or virtual, and may include a single processing unit or a plurality of processing units and/or cores. In some implementations, the processor 304 may be capable of generating and providing electronic display signals to a display device 316, supporting the display of images, capturing and transmitting images, and performing complex tasks including various types of feature extraction and sampling. In some implementations, the processor 304 may be coupled to the memory 306 via the bus 320 to access data and instructions therefrom and store data therein. The bus 320 may couple the processor 304 to the other components of the computing device 300 including, for example, the memory 306, the communication unit 302, the display device 316, the input/output device(s) 314, and the data storage 308.

The memory 306 may store and provide access to data for the other components of the computing device 300. The memory 306 may be included in a single computing device or distributed among a plurality of computing devices as discussed elsewhere herein. In some implementations, the memory 306 may store instructions and/or data that may be executed by the processor 304. For example, the memory 306 may store one or more of the user application 110, impatient query engine 112, web service 111, function(s) 116, and their respective components, depending on the configuration. The instructions and/or data may include code for performing the techniques described herein. The memory 306 is also capable of storing other instructions and data, including, for example, an operating system, hardware drivers, other software applications, databases, etc. The memory 306 may be coupled to the bus 320 for communication with the processor 304 and the other components of the computing device 300.

The memory 306 may include one or more non-transitory computer-usable (e.g., readable, writeable) device, a static random access memory (SRAM) device, a dynamic random access memory (DRAM) device, an embedded memory device, a discrete memory device (e.g., a PROM, FPROM, ROM), a hard disk drive, an optical disk drive (CD, DVD, Blu-ray™, etc.) mediums, which can be any tangible apparatus or device that can contain, store, communicate, or transport instructions, data, computer programs, software, code, routines, etc., for processing by or in connection with the processor 304. In some implementations, the memory 306 may include one or more of volatile memory and non-volatile memory. It should be understood that the memory 306 may be a single device or may include multiple types of devices and configurations.

The bus 320 may represent one or more buses including an industry standard architecture (ISA) bus, a peripheral component interconnect (PCI) bus, a universal serial bus (USB), or some other bus providing similar functionality. The bus 320 may include a communication bus for transferring data between components of the computing device 300 or between computing device 300 and other components of the system 100 via the network 105 or portions thereof, a processor mesh, a combination thereof, etc. In some implementations, the components (e.g., 110, 111, 116, 112) and various other software operating on the computing device 300 (e.g., an operating system, device drivers, etc.) may cooperate and communicate via a software communication mechanism implemented in association with the bus 320. The software communication mechanism may include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication may be configured to be secure (e.g., SSH, HTTPS, etc.)

The communication unit 302 is hardware for receiving and transmitting data by linking the processor 304 to the network 105 and other processing systems via signal line 104. The communication unit 302 may receive data such as requests from the client device 115 and transmit the requests to the web service 111 and impatient query engine 112, for example. The communication unit 302 also transmits information including media to the client device 115 for display, for example, in response to the request. The communication unit 302 is coupled to the bus 320. In some implementations, the communication unit 302 may include a port for direct physical connection to the client device 115 or to another communication channel. For example, the communication unit 302 may include an RJ45 port or similar port for wired communication with the client device 115. In other implementations, the communication unit 302 may include a wireless transceiver (not shown) for exchanging data with the client device 115 or any other communication channel using one or more wireless communication methods, such as IEEE 802.11, IEEE 802.16, Bluetooth® or another suitable wireless communication method. In yet other implementations, the communication unit 302 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still other implementations, the communication unit 302 may include a wired port and a wireless transceiver. The communication unit 302 also provides other conventional connections to the network 105 for distribution of files and/or media objects using standard network protocols such as TCP/IP, HTTP, HTTPS, and SMTP as will be understood to those skilled in the art.

The display device 316 may be any conventional display device, monitor or screen, including but not limited to, a liquid crystal display (LCD), light emitting diode (LED), organic light-emitting diode (OLED) display or any other similarly equipped display device, screen or monitor. The display device 316 represents any device equipped to display user interfaces, electronic images, and data as described herein. In some implementations, the display device 316 may output display in binary (only two different values for pixels), monochrome (multiple shades of one color), or multiple colors and shades. The display device 316 is coupled to the bus 320 for communication with the processor 304 and the other components of the computing device 300. In some implementations, the display device 316 may be a touch-screen display device capable of receiving input from one or more fingers of a user. For example, the display device 316 may be a capacitive touch-screen display device capable of detecting and interpreting multiple points of contact with the display surface. In some implementations, the computing device 300 (e.g., client device 115) may include a graphics adapter (not shown) for rendering and outputting the images and data for presentation on display device 316. The graphics adapter (not shown) may be a separate processing device including a separate processor and memory (not shown) or may be integrated with the processor 304 and memory 306.

The input/output (I/O) device(s) 314 may include any standard device for inputting or outputting information and may be coupled to the computing device 300 either directly or through intervening I/O controllers. In some implementations, the I/O device 314 may include one or more peripheral devices. Non-limiting example I/O devices 314 include a touch screen or any other similarly equipped display device equipped to display user interfaces, electronic images, and data as described herein, a touchpad, a keyboard, a pointing device, a printer, a haptic device, a scanner, an image/video capture device (e.g., camera), a stylus, an audio reproduction device (e.g., speaker), a microphone array, a barcode reader, an eye gaze tracker, a sip-and-puff device, and any other I/O components for facilitating communication and/or interaction with users. In some implementations, the functionality of the I/O device 314 and the display device 316 may be integrated, and a user of the computing device 300 (e.g., client device 115) may interact with the computing device 300 by contacting a surface of the display device 316 using one or more fingers. For example, the user may interact with an emulated (i.e., virtual or soft) keyboard displayed on the touch-screen display device 316 by using fingers to contact the display in the keyboard regions.

The data storage 308 is a non-transitory memory that stores data for providing the functionality described herein. In some implementations, the data storage 308 may be coupled to the components of the computing device 300 via the bus 320 to receive and provide access to data. In some implementations, the data storage 308 may store data received from other elements of the system 100 including, for example, entities 120, 130, 115, and/or the impatient query engine 112, and may provide data access to these entities.

The data storage 308 may be included in the computing device 300 or in another computing device and/or storage system distinct from but coupled to or accessible by the computing device 300. The data storage 308 may include one or more non-transitory computer-readable mediums for storing the data. In some implementations, the data storage 308 may be incorporated with the memory 306 or may be distinct therefrom. The data storage 308 may be a dynamic random-access memory (DRAM) device, a static random-access memory (SRAM) device, flash memory, or some other memory devices. In some implementations, the data storage 308 may include a database management system (DBMS) operable on the computing device 300. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations. In other implementations, the data storage 308 also may include a non-volatile memory or similar permanent storage device and media including a hard disk drive, a CD-ROM device, a DVD-ROM device, a DVD-RAM device, a DVD-RW device, a flash memory device, or some other mass storage device for storing information on a more permanent basis.

The data stored by the data storage 308 may organized and queried using various criteria including any type of data stored by them, such as described herein. The data storage 308 may include data tables, databases, or other organized collections of data. Examples of the types of data stored by the data storage 308 may include, but are not limited to the data described with respect to the figures, for example.

It should be understood that other processors, operating systems, sensors, displays, and physical configurations are possible.

It should be understood that the methods described herein are provided by way of example, and that variations and combinations of these methods, as well as other methods, are contemplated. For example, in some implementations, at least a portion of one or more of the methods represent various segments of one or more larger methods and may be concatenated or various steps of these methods may be combined to produce other methods which are encompassed by the present disclosure. Additionally, it should be understood that various operations in the methods are iterative, and thus repeated as many times as necessary generate the results described herein. Further the ordering of the operations in the methods is provided by way of example and it should be understood that various operations may occur earlier and/or later in the method without departing from the scope thereof.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one implementation" or "an implementation" means that a particular feature, structure, or characteristic described in connection with the implementation is included in at least one implementation. The appearances of the phrase "in one implementation" in various places in the specification are not necessarily all referring to the same implementation.

In some instances, various implementations may be presented herein in terms of algorithms and symbolic representations of operations on data bits within a computer memory. These algorithmic descriptions and representations are, in some circumstances, used by those skilled in the data processing arts to convey the substance of their work to others skilled in the art. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms such as "processing," "computing," "calculating," "determining," "displaying," or the like, refer to the action and methods of a computer system that manipulates and transforms data represented as physical (electronic) quantities within the computer system's registers and memories into other data similarly represented as physical quantities within the computer system memories or registers or other such information storage, transmission or display devices.

The techniques also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code, such as the computing systems, entities, and/or devices discussed herein, may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices can be coupled to the system either directly or through intervening I/O controllers. The data processing system may include an apparatus may be specially constructed for the required purposes, or it may comprise a general-purpose computer selectively activated or reconfigured by a computer program stored in the computer.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects may not be mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. The technology can also take the form of a computer program product accessible from a computer-usable or computer-readable medium providing program code for use by or in connection with a computer or any instruction execution system. Wherever a component, an example of which is a module or engine, of the specification is implemented as software, the component can be implemented as a standalone program, as part of a larger program, as a plurality of separate programs, as a statically or dynamically linked library, as a kernel loadable module, as firmware, as resident software, as microcode, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented method comprising:
   determining, by a stateful server, a first set of requests in association with a client operation;
   issuing, by the stateful server, the first set of requests to a stateless computing platform;
   determining, by the stateful server, whether a cumulative percentage of requests serviced with a response from the stateless computing platform in the first set of requests issued to the stateless computing platform meets a threshold;
   responsive to determining that the cumulative percentage of requests serviced with the response from the stateless computing platform in the first set of requests issued to the stateless computing platform meets the threshold, reissuing, by the stateful server, a remainder of the requests from the first set of requests as a second set of requests to the stateless computing platform, the remainder of the requests pending a response from the stateless computing platform prior to the reissuing; and
   monitoring, by the stateful server, the first set and the second set of requests in parallel until the remainder of the requests in either the first set or the second set of requests is serviced with a response from the stateless computing platform.

2. The computer-implemented method of claim 1, wherein reissuing the remainder of the requests from the first set of requests as the second set of requests to the stateless computing platform further comprises:
   identifying the remainder of the requests in the first set of requests as having a potential issue;
   copying the remainder of the requests from the first set of requests to the second set of requests; and
   issuing the second set of requests to the stateless computing platform.

3. The computer-implemented method of claim 1, wherein reissuing the remainder of the requests from the first set of requests as the second set of requests to the stateless computing platform further comprises retaining the remainder of the requests in the first set of requests and waiting for the remainder of the requests in the first set of requests to be serviced by the stateless computing platform.

4. The computer-implemented method of claim 1, wherein monitoring the first set and the second set of requests in parallel until the remainder of the requests in either the first set or the second set of requests is serviced with a response from the stateless computing platform further comprises:
   identifying whether the remainder of the requests in one of the first set and the second set of requests is serviced before other one of the first set and the second set of requests by the stateless computing platform; and
   responsive to identifying that the remainder of the requests in one of the first set and the second set of requests is serviced before other one of the first set and the second set of requests, canceling the remainder of the requests in the other one of the first set and the second set of requests issued to the stateless computing platform.

5. The computer-implemented method of claim 1, further comprising:
determining whether servicing of the cumulative percentage of requests in the first set of requests by the stateless computing platform to meet the threshold is possible; and
responsive to determining that the servicing of the cumulative percentage of requests in the first set of requests by the stateless computing platform to meet the threshold is impossible, reissuing at least a portion of the first set of requests to the stateless computing platform based on a tradeoff between a cost of reissue and servicing of the first set of requests.

6. The computer-implemented method of claim 1, further comprising:
determining a failure rate of the stateless computing platform; and
determining the threshold based on the failure rate of the stateless computing platform.

7. The computer-implemented method of claim 6, wherein the threshold is a difference between 100 and a multiple of the failure rate.

8. The computer-implemented method of claim 6, wherein a number of times that the second set of requests is reissued to the stateless computing platform is based on the failure rate.

9. The computer-implemented method of claim 6, wherein the failure rate is one of a statistical failure rate and a dynamically measured failure rate.

10. The computer-implemented method of claim 1, wherein the threshold is set in a range from 85 percent to 99 percent.

11. A system comprising:
a stateless computing platform configured to receive and service a first set of requests and a second set of requests from a stateful server;
the stateful server configured to:
determine the first set of requests in association with a client operation;
issue the first set of requests to the stateless computing platform;
determine whether a cumulative percentage of requests serviced with a response from the stateless computing platform in the first set of requests issued to the stateless computing platform meets a threshold;
responsive to determining that the cumulative percentage of requests serviced with the response from the stateless computing platform in the first set of requests issued to the stateless computing platform meets the threshold, reissue a remainder of the requests from the first set of requests as the second set of requests to the stateless computing platform, the remainder of the requests pending a response from the stateless computing platform prior to the reissue; and
monitor, in parallel, the first set and the second set of requests until the remainder of the requests in either the first set or the second set of requests is serviced with a response from the stateless computing platform.

12. The system of claim 11, wherein to reissue the remainder of the requests from the first set of requests as the second set of requests to the stateless computing platform, the stateful server is further configured to:
identify the remainder of the requests in the first set of requests as having a potential issue;
copy the remainder of the requests from the first set of requests to the second set of requests; and
issue the second set of requests to the stateless computing platform.

13. The system of claim 11, wherein to reissue the remainder of the requests from the first set of requests as the second set of requests to the stateless computing platform, the stateful server is further configured to retain the remainder of the requests in the first set of requests and wait for the remainder of the requests in the first set of requests to be serviced by the stateless computing platform.

14. The system of claim 11, wherein to monitor the first set and the second set of requests in parallel until the remainder of the requests in either the first set or the second set of requests is serviced with a response from the stateless computing platform, the stateful server is further configured to:
identify whether the remainder of the requests in one of the first set and the second set of requests is serviced before other one of the first set and the second set of requests by the stateless computing platform; and
responsive to identifying that the remainder of the requests in one of the first set and the second set of requests is serviced before other one of the first set and the second set of requests, cancel the remainder of the requests in the other one of the first set and the second set of requests issued to the stateless computing platform.

15. The system of claim 11, wherein the stateful server is further configured to:
determine whether servicing of the cumulative percentage of requests in the first set of requests by the stateless computing platform to meet the threshold is possible; and
responsive to determining that the servicing of the cumulative percentage of requests in the first set of requests by the stateless computing platform to meet the threshold is impossible, reissue at least a portion of the first set of requests to the stateless computing platform based on a tradeoff between a cost of reissue and servicing of the first set of requests.

16. The system of claim 11, wherein the stateful server is further configured to:
determine a failure rate of the stateless computing platform; and
determine the threshold based on the failure rate of the stateless computing platform.

17. The system of claim 16, wherein the threshold is a difference between 100 and a multiple of the failure rate.

18. The system of claim 16, wherein a number of times that the second set of requests is reissued to the stateless computing platform is based on the failure rate.

19. The system of claim 16, wherein the failure rate is one of a statistical failure rate and a dynamically measured failure rate.

20. The system of claim 11, wherein the threshold is set in a range from 85 percent to 99 percent.

* * * * *